United States Patent
Fukutani (10) Patent No.: US 6,661,131 B2
(45) Date of Patent: Dec. 9, 2003

(54) MOTOR AND APPARATUS USING THE SAME MOTOR

(75) Inventor: Hideshi Fukutani, Tottori (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 28 days.

(21) Appl. No.: 10/083,569

(22) Filed: Feb. 27, 2002

(65) Prior Publication Data

US 2002/0117911 A1 Aug. 29, 2002

(30) Foreign Application Priority Data

Feb. 28, 2001 (JP) ........................................ 2001-054002

(51) Int. Cl.[7] .................... H02K 5/24; H02K 5/00; H02K 5/16; H02K 21/26; H02K 15/00
(52) U.S. Cl. .................... 310/51; 310/91; 310/90; 310/154.01; 310/42
(58) Field of Search .................... 310/67 R, 89, 310/88, 85, 90, 90.5, 51, 154.08, 91, 152, 154.11, 42, 154.43, 154.16, 154.03, 154.02, 154.01, 254; 29/596; 277/303, 412; 360/98.07, 99.04

(56) References Cited

U.S. PATENT DOCUMENTS

| | | | | |
|---|---|---|---|---|
| 2,427,947 A | * | 9/1947 | Koch | 310/67 R |
| 3,840,761 A | * | 10/1974 | Muller | 310/254 |
| 3,873,897 A | * | 3/1975 | Muller | 310/172 |
| 4,099,104 A | * | 7/1978 | Muller | 318/254 |
| 4,429,263 A | * | 1/1984 | Muller | 310/68 R |
| 4,647,803 A | * | 3/1987 | von der Heide et al. | 310/51 |
| 4,710,667 A | * | 12/1987 | Whiteley | 310/268 |
| 4,717,850 A | * | 1/1988 | Muller | 310/67 R |
| 4,800,307 A | * | 1/1989 | Papst | 310/67 R |
| 5,457,588 A | * | 10/1995 | Hattori et al. | 360/99.08 |
| 5,623,382 A | * | 4/1997 | Moritan et al. | 360/99.08 |
| 5,659,217 A | * | 8/1997 | Petersen | 310/156.26 |
| 5,715,116 A | * | 2/1998 | Moritan et al. | 360/99.08 |
| 5,831,355 A | * | 11/1998 | Oku | 310/42 |
| 5,952,756 A | * | 9/1999 | Hsu et al. | 310/89 |
| 5,998,900 A | * | 12/1999 | Wang | 310/91 |
| 6,010,246 A | * | 1/2000 | Gomyo et al. | 384/115 |
| 6,011,340 A | * | 1/2000 | Bonura | 310/91 |
| 6,023,839 A | * | 2/2000 | Kinoshita et al. | 310/67 R |
| 6,043,583 A | * | 3/2000 | Kurosawa et al. | 310/254 |
| 6,084,328 A | * | 7/2000 | Yamashita et al. | 310/90 |
| 6,097,121 A | * | 8/2000 | Oku | 310/91 |
| 6,100,610 A | * | 8/2000 | Katagiri et al. | 310/42 |
| 6,131,422 A | * | 10/2000 | Skrippek et al. | 310/42 |
| 6,229,237 B1 | * | 5/2001 | Obara et al. | 310/254 |
| 6,242,830 B1 | * | 6/2001 | Katagiri | 310/90 |
| 6,265,797 B1 | * | 7/2001 | Horng | 310/90 |
| 6,362,931 B2 | * | 3/2002 | Oelsch | 360/99.08 |
| 6,407,472 B1 | * | 6/2002 | Takayanagi | 29/596 |
| 6,507,135 B1 | * | 1/2003 | Winkler | 310/91 |
| 6,545,379 B2 | * | 4/2003 | Gomyo | 310/67 R |

FOREIGN PATENT DOCUMENTS

| | | |
|---|---|---|
| JP | 8-289523 | 11/1996 |
| JP | 11-55900 | 2/1999 |
| JP | 2000-245116 | 9/2000 |

* cited by examiner

Primary Examiner—Nestor Ramirez
Assistant Examiner—Guillermo Perez
(74) Attorney, Agent, or Firm—Wenderoth, Lind & Ponack, L.L.P.

(57) ABSTRACT

A motor has plural through-holes punched in a top surface of its frame. A cap made of magnetic material is placed at a location on a stator which corresponds to the through-holes, and the cap is spaced axially from the through holes. An attracting magnet is placed outside the cap. This structure allows a bearing to hold its oil, and generates attracting force in an axial direction without adversely affecting driving-magnetic-circuits. As a result, an apparatus using this motor can be low in profile and run at a high speed.

9 Claims, 8 Drawing Sheets

MOTOR AND APPARATUS USING THE SAME MOTOR

FIELD OF THE INVENTION

The present invention relates to a motor to be used for recording and/or reproducing information stored in a compact disc or a video disc, and an apparatus using the same motor. More particularly, it relates to a motor structure which can improve oil-holding performance of oil-impregnated metal, and a motor structure which can restrain a rotor from moving and vibrating axially due to axial attraction from an attracting magnet.

BACKGROUND OF THE INVENTION

Recently, oil-impregnated metal made of porous metal has been widely used for a bearing in order to meet a requirement of lowering cost of motors that drive optical discs or optical-magneto discs for recording and/or reproducing information stored therein. However, an apparatus such as a compact-disc player or a videodisc player runs at a speed higher than ever, and this trend reduces long-term reliability of the bearing, and thus the motors encounter the following problems:

necessity of an oil-holding structure of the oil-impregnated metal which forms the bearing; and measures against oil splashing from the oil-impregnated metal.

If a rotor moves or vibrates axially when the motor is driven at a high speed, errors could occur in reading/writing information from/to a disc.

Figure 9:
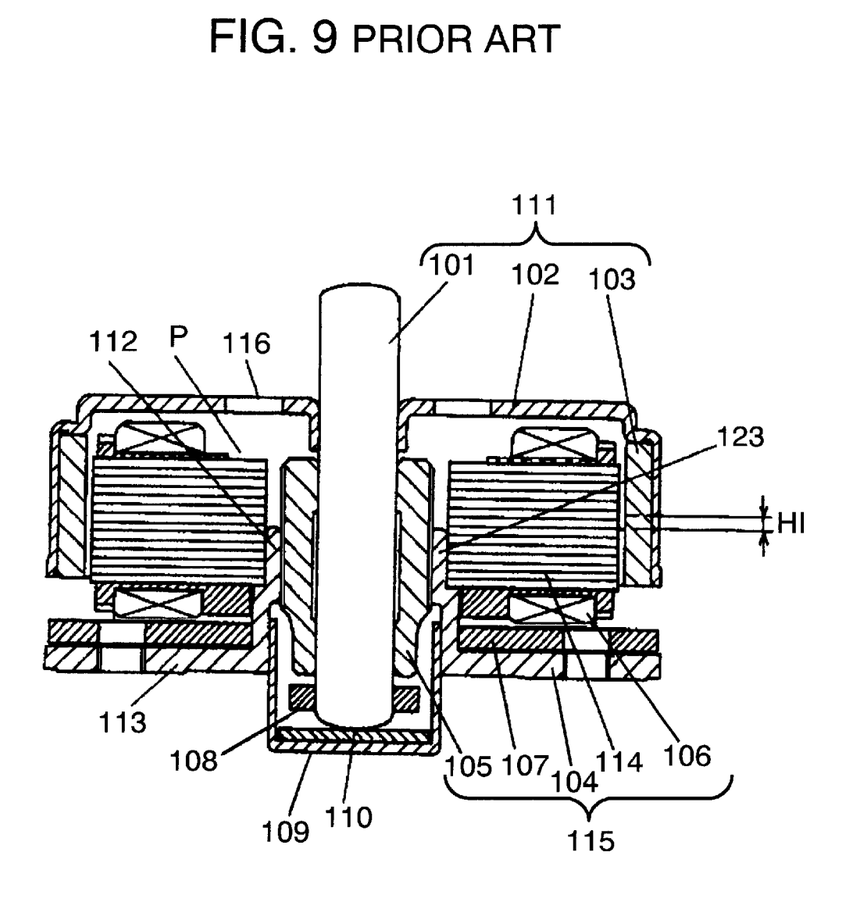
FIG. 9 shows a structure of a conventional motor.

A conventional motor is disclosed in Japanese Published Unexamined Patent Application No. H08-289523. FIG. 9 shows a construction of conventional motor. In FIG. 9, shaft 101 transmits rotation. Ring-shaped rotor-magnet 103 is press-fitted or rigidly bonded to an inner wall of frame 102. Magnet 103 is multipolar magnetized in a circumferential direction. A burring process is applied to a central section of frame 102, and shaft 101 is directly press-fitted into the burring-processed section. Rotor 111 comprises shaft 101, frame 102 and magnet 103.

Bracket 104 made of magnetic material is formed by press working, and has a burring-processed section 112 that projects like steps at an approximately central portion thereof. Burring-processed section 112 works as bearing housing 123 accommodating a bearing. Bracket 104 includes burring-processed section 112 with which mounting-base 113 is unitarily formed. Mounting-base 113 is used for mounting a motor to an apparatus.

On an inner wall of burring-processed section 112, oil-impregnated metal 105 is press-fitted for supporting shaft 101 rotatably. On the other hand, on an outer wall of burring-processed section 112, stator core 114 is press-fitted. On stator core 114, copper wire 106 is wound via an insulator made of resin.

Printed circuit board 107, which includes at least a part of circuits driving and controlling the motor, is rigidly bonded to mounting-base 113 with double-faced adhesive tape (not shown). An end of copper wire 106 is connected onto board 107.

Stopper 108, for preventing rotor 111 from coming off in a thrust direction, is formed by metal pressing work. Stopper 108 is press-fitted onto an end of shaft 101. Bottom plate 109 bears load of rotor 111 in the thrust direction via resin board 110 exhibiting abrasion resistance. Bottom plate 109 is press-fitted into an inner wall of burring-processed section 112.

A plurality of through-holes 116 are punched in a top plate of frame 102. When bottom plate 109 is press-fitted into section 112, face "P" of stator core 114 can be supported with a jig (not shown) extending through holes 116, so that a force caused by press-fitting is restrained from being applied to mounting-base 113.

However, the structure discussed above allows oil leaked from a top of oil-impregnated metal 105 to splash outwardly during rotation of rotor 111. The oil splashed moves to stator core 114, travels on the inner wall of frame 102 and arrives at magnet 103.

As a result, the oil impregnated in metal 105 decreases, which lowers reliability of the bearing spinning at a high speed. Thus, the motor is not suited for an apparatus demanded to spin at a higher speed.

In the conventional motor discussed above, attraction force (called magnetic thrust) working axially between stator 115 and rotor 111 is produced by deviation between a center of an axial length of stator core 114 and a center of an axial length of rotor magnet 103. In other words, the attraction force can be produced by shifting magnetic center H1 appropriately. This attraction force working between stator 115 and rotor 111 allows a disc to vibrate less in an axial direction, thereby preventing read/write errors.

Another conventional motor, having different structure to produce an attraction force, is disclosed in Japanese Published Unexamined Patent Application No. H11-55900. The motor disclosed in this application comprises the following elements:

a rotary shaft;

a bearing for journaling the rotary shaft;

a hub fixed to the rotary shaft;

a stopper, for preventing a motor from coming off, made of magnetic material and fixed to the hub;

an attracting magnet mounted to the stopper;

a bracket for holding the bearing; and a coil assembly fixed to the bracket.

The attracting magnet faces a core of the coil assembly. The stopper slides with the bearing only when a rotating body moves. This structure prevents the motor from coming off, and restrains vibrations in both a radial and a thrust direction.

However, according to the publication discussed above, oil leaked from an oilless bearing cannot be collected or returned to the bearing per se; therefore, it is difficult to further improve reliability of the motor spinning at a higher speed. Major magnetic field produced by a driving current running through the coil is affected by magnetic flux from the attracting magnet because the attracting magnet is disposed closely to the coil assembly, and the major magnetic field produces magnetic interference.

Still another conventional motor is disclosed in Japanese Published Unexamined Patent Application No. 2000-245116. This conventional motor comprises the following elements:

a stationary member;

a rotor rotatable with respect to the stationary member;

a bearing disposed between the stationary member and the rotor;

a rotor magnet mounted to the rotor; and a stator mounted to the stationary member.

The rotor includes a cup-shaped rotor made of magnetic material. The cup-shaped rotor has an annular wall and an end wall disposed on a first end of the annular wall. The rotor magnet is formed of a sheet-like rubber magnet. This rubber magnet is mounted forming a ring shape on an inner face of the annular wall. Magnetic energizing structure, for energizing the rotor axially, is mounted to the stationary member, wherein the magnetic energizing structure includes a sintered magnet of ferrite system and faces the end wall of the cup-shaped rotor. This structure allows the conventional motor to be manufactured at a lower cost and obtain desirable energizing force.

However, this structure needs additionally a holder as an element of the magnetic energizing structure, and yet, this structure cannot collect oil leaked from an oilless bearing or return the oil to the bearing per se. Therefore, it is difficult for this structure to further improve reliability of the bearing spinning at a higher speed. Furthermore, since the energizing structure is placed above the stator core, this structure is not suited for a motor used in a slim apparatus.

SUMMARY OF THE INVENTION

The present invention addresses the problems discussed above, and aims to provide a motor suitable for a disc driving apparatus which records and/or reproduces information stored in a compact disc, videodisc, optical disc, optical magneto disc or the like, and an apparatus using the same motor.

To be more specific, the present invention aims to provide a motor structure that meets a requirement of downsizing and lowering of profile of an apparatus as well as improves reliability of a motor-bearing spinning at a higher speed. At the same time, the present invention aims to provide a motor in a simple construction which prevents a disc from moving or vibrating in an axial direction in order to reduce read/write errors, and an apparatus using the same motor.

The motor of the present invention comprises the following elements:

(a) a bracket incorporating a bearing housing, and a mounting base for mounting a motor to an apparatus;
(b) oil-impregnated metal fixed to an inner wall of the bearing housing;
(c) a stator in which a stator core wound with coils is disposed on an outer wall of the bearing housing;
(d) a rotor including a frame having a plurality of through holes in a top surface of the frame, a shaft fixed to the frame, and a rotor magnet fixed to the frame; and
(e) a cap facing the through holes and disposed at a place spaced from the through holes.

The apparatus of the present invention includes a housing, and the motor discussed above is mounted in the housing via the mounting base.

The motor structure discussed above allows the stator to be supported with, e.g., supporting-pins through the through holes because the cap is positioned at a place corresponding to the through holes punched in the frame. Force generated in assembling the motor is thus not applied to the mounting base, so that the assembly does not impair precision of the mounting base. Further, the cap can prevent oil from splashing.

DETAILED DESCRIPTION OF PREFERRED EMBODIMENTS

Exemplary embodiments of the present invention are demonstrated hereinafter with reference to the accompanying drawings.

First Exemplary Embodiment

Figure 1A:
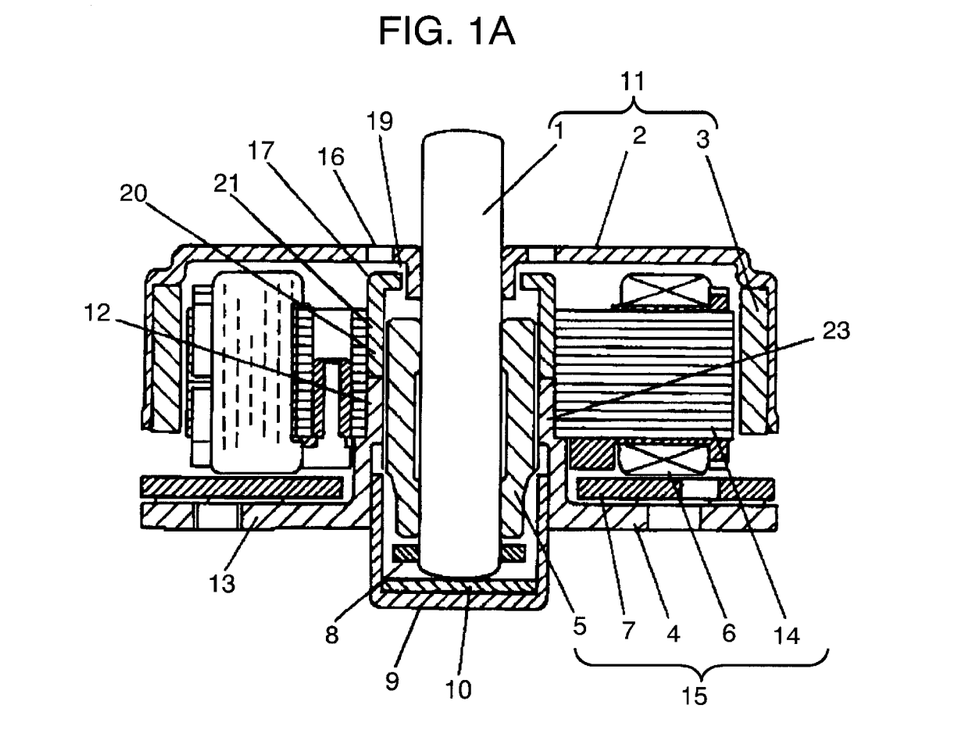
FIG. 1A shows a structure of a motor in accordance with a first exemplary embodiment of the present invention.
Figure 1B:
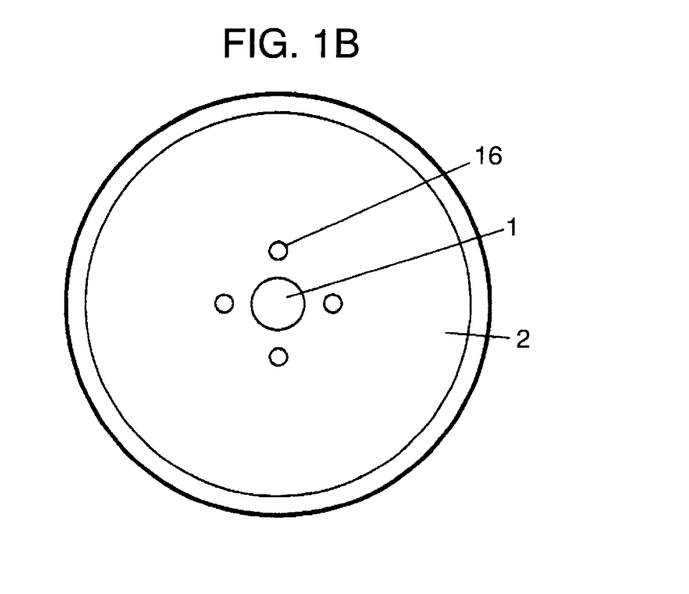
FIG. 1B is a top view of a rotor of the motor shown in FIG. 1A.
Figure 2:
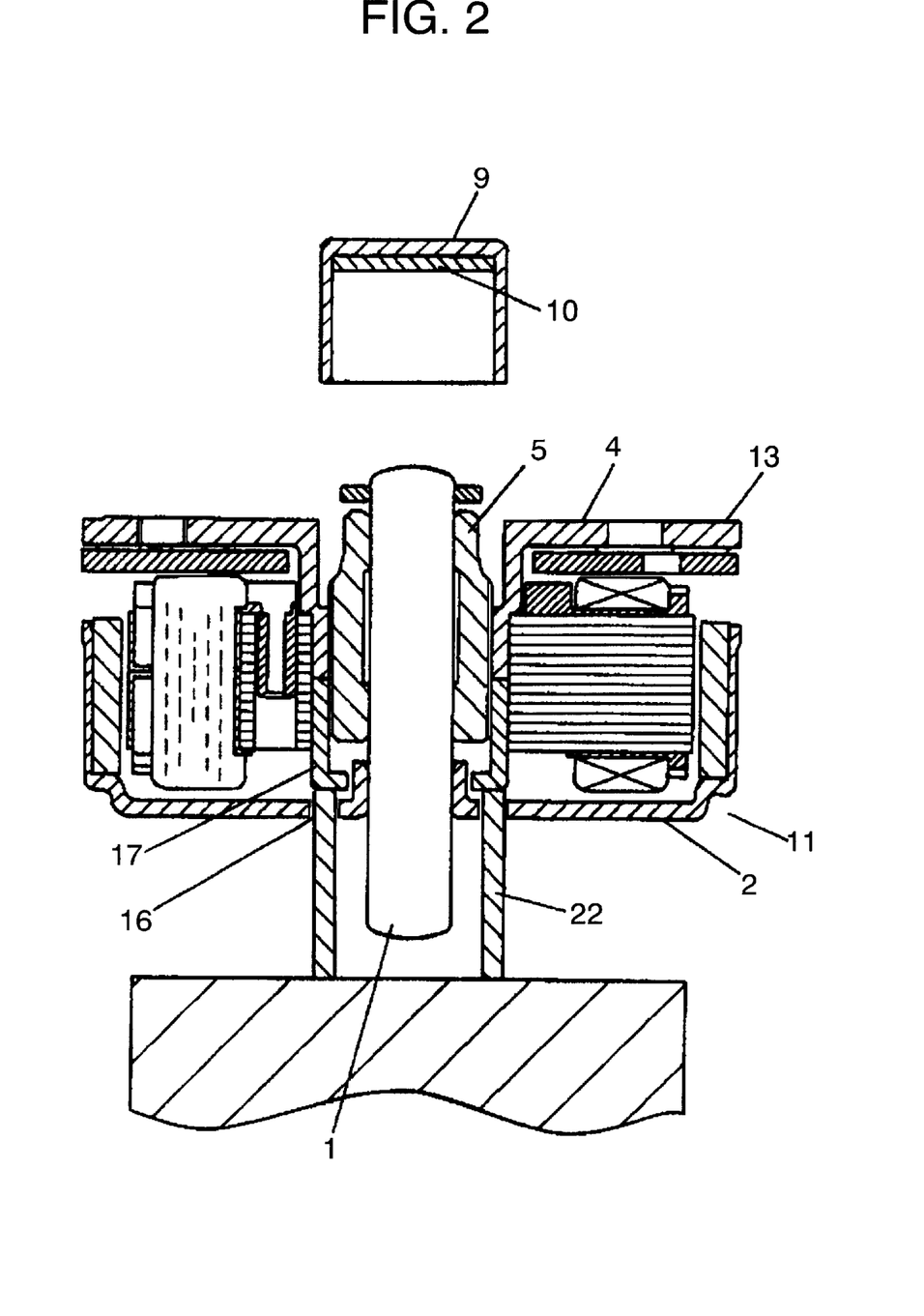
FIG. 2 illustrates how a bottom plate of the motor shown in FIG. 1A is press-fitted.

FIG. 1A shows a structure of a motor in accordance with the first exemplary embodiment of the present invention. FIG. 1B is a top view of a rotor of the motor shown in FIG. 1A. FIG. 2 illustrates how a bottom plate of the motor shown in FIG. 1A is press-fitted.

In FIG. 1A and FIG. 1B, shaft 1 outputs power of the motor, for instance, it transmits rotation to a disc. Ring-shaped rotor-magnet 3 is press-fitted or rigidly bonded to an inner wall of frame 2. Magnet 3 is multipolar magnetized in a circumferential direction. A burring process is applied to a central portion of frame 2, and shaft 1 is directly press-fitted into a first burring-processed section. Rotor 11 comprises shaft 1, frame 2 and magnet 3.

Bracket 4 made of magnetic material is formed by press working, and has a second burring-processed section 12 that projects like steps at an approximately central portion thereof. Burring-processed section 12 works as bearing housing 23 accommodating a bearing. Bracket 4 includes burring-processed section 12 with which mounting-base 13 is unitarily formed. Mounting base 13 is used for mounting the motor to an apparatus. This unitary formation improves accuracy of right angles of mounting base 13 with respect to burring-processed section 12.

On an inner wall of burring-processed section 12, oil-impregnated metal 5 is press-fitted for supporting shaft 1 rotatably. On the other hand, on an outer wall of section 12, stator core 14 is press-fitted. On core 14, copper wire 6 is wound via an insulator made of resin.

Printed circuit board 7, which contains at least a part of circuits driving and controlling the motor, is rigidly bonded to mounting base 13 with double-faced adhesive tape (not shown). An end of copper wire 6 is connected onto board 7. Stator 15 comprises bracket 4, oil-impregnated metal 5, copper wire 6, board 7 and stator core 14.

Four through-holes 16 (at least two holes) are punched in a top surface of frame 2. Cap 17 is placed at a location spaced axially from the through holes 16. To be more specific, a first end of cap 17 faces through holes 16, and cap 17 is press-fitted from its second end into an inner wall of stator core 14 so that cap 17 is spaced from the top plate of frame 2 in an axial direction. Also, as shown in FIG. 1A, the cap 17 has a lower end surface which contacts an upper end surface of the bearing housing 23 so as to form a barrier between the stator core 14 and the oil-impregnated metal 5.

Stopper 8 prevents rotor 11 from coming off in a thrust direction and is formed by metal-pressing work. Stopper 8 is press-fitted to an end of shaft 1. Bottom plate 9 bears load of rotor 11 in the thrust direction via resin board 10 which exhibits abrasion resistance. Bottom plate 9 is press-fitted into an inner wall of burring-processed section 12.

A sectional form of cap 17 is described hereinafter. An end face on the side of first end 19, which is not press-fitted to stator core 14, of cap 17 has a smaller inner diameter than that of another section 20 of cap 17, where section 20 is press-fitted. This formation prevents oil from splashing outside cylindrical section 21 of cap 17 even if the oil leaks from a top of oil-impregnated metal during rotation, because cylindrical section 21 of cap 17 works as a barrier against oil splashing.

A radial gap is provided between an outer wall of metal 5 and an inner wall of cylindrical section 21. Oil splashing to cylindrical section 21 enters into the radial gap, and returns to oil-impregnated metal 5. This radial gap can thus recycle the oil. The structure discussed above improves oil-holding performance of metal 5, and collects the splashed oil and returns it to oil impregnated metal 5 per se.

A process of press-fitting the bottom plate of the motor shown in FIG. 1A is demonstrated with reference to FIG. 2. As discussed above, a plurality of through-holes are punched in frame 2 of rotor 11. When bottom plate 9 is press-fitted to burring-processed section 12 of bracket 4, supporting pins 22 support an end face of cap 17 through through-holes 16. Force produced during press-fitting is thus not applied to mounting base 13 of bracket 4 when the motor is assembled.

Bottom plate 9 can be press-fitted while mounting base 13 is held at accurate right angles with respect to burring-processed section 12 of bracket 4. Mounting base 13, oil-impregnated metal 5 press-fitted to mounting base 13, and shaft 1 journaled by metal 5 can thus be assembled at accurate right angles with respect to burring-processed section 12.

Second Exemplary Embodiment

Figure 3A:
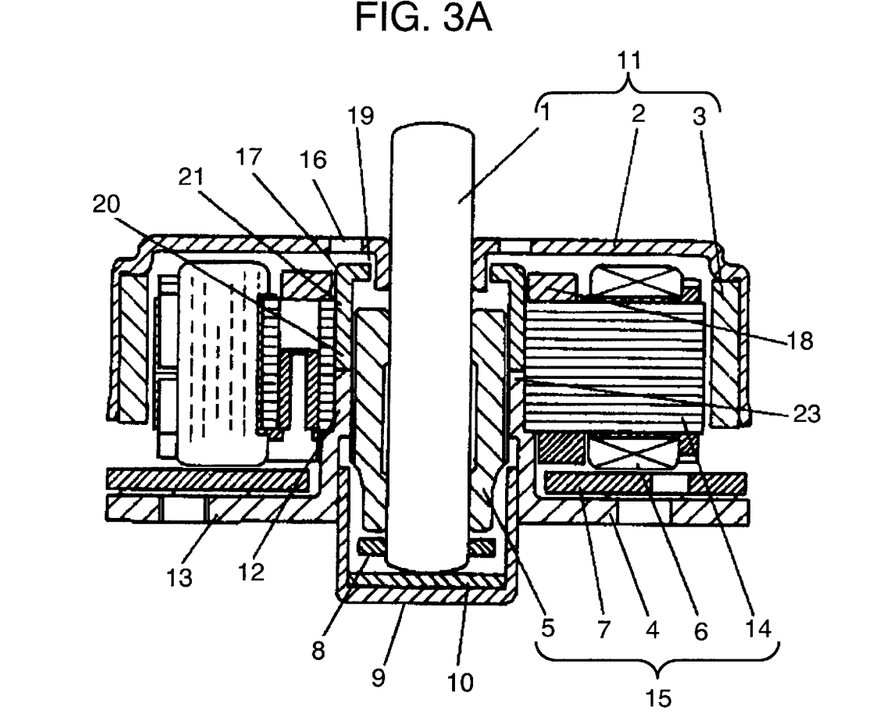
FIG. 3A shows a structure of a motor in accordance with a second exemplary embodiment of the present invention.
Figure 3B:
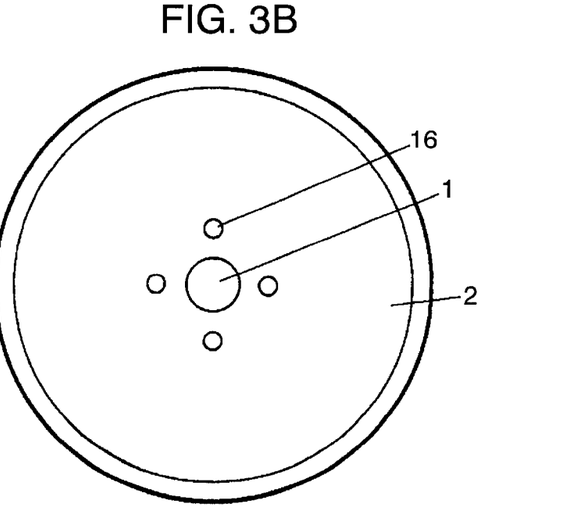
FIG. 3B is a top view of a rotor of the motor shown in FIG. 3A.
Figure 4:
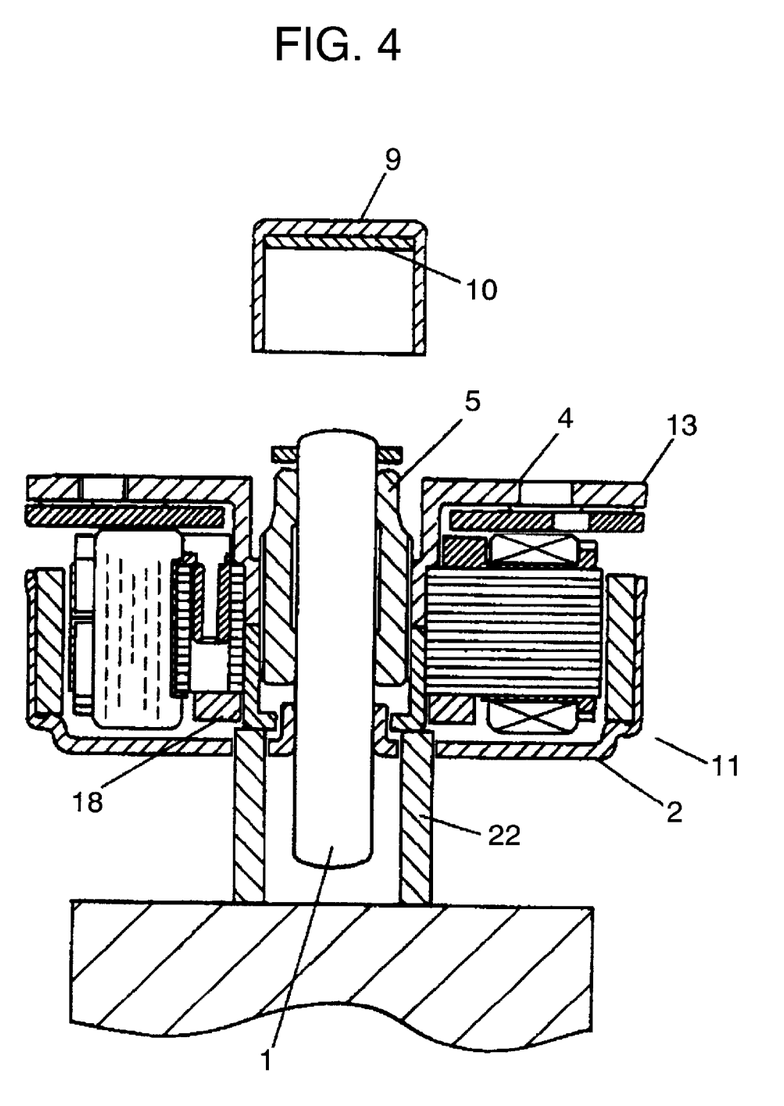
FIG. 4 illustrates how a bottom plate of the motor shown in FIG. 3A is press-fitted.

FIG. 3A shows a structure of a motor in accordance with the second exemplary embodiment of the present invention. FIG. 3B is a top view of a rotor of the motor shown in FIG. 3A. FIG. 4 illustrates how a bottom plate of the motor shown in FIG. 3A is press-fitted.

The second embodiment differs from the first one in the following points: Cap 17 in accordance with the second embodiment is made of magnetic material, and attracting magnet 18 is placed on a top surface of stator core 14 which is disposed outside of cap 17. Magnet 18 is made of material having excellent magnetic characteristics such as sintered magnet of Neodymium-Iron-Boron (Nd-Fe-B) system. In the second embodiment, elements similar to those in the first embodiment have the same reference marks.

Press-fitting the bottom plate of the motor shown in FIG. 3A is demonstrated with reference to FIG. 4. A plurality of through-holes 16 are punched in a top surface of frame 2 of rotor 11. When bottom plate 9 is press-fitted into bracket 4, supporting pins 22 support an end face of cap 17 through through-holes 16. The force produced during press-fitting bottom plate 9 is thus not applied to mounting base 13 of bracket 4 during assembly of the motor.

Bottom plate 9 is therefore press-fitted into bracket 4 while right angles of mounting base 13 with respect to burring-processed section 12 of bracket 4 are accurately maintained. Mounting base 13, oil-impregnated metal 5 press-fitted to mounting base 13, and shaft 1 journaled by metal 5 can thus be assembled at accurate right angles with respect to burring-processed section 12.

In this second embodiment, a height of an end face of cap 17 on the side of first end 19 is greater than that of an end face of attracting magnet 18. Supporting pins 22 thus positively support the end face of cap 17 on the side of first end 19 of shaft 1, and when bottom plate 9 is press-fitted, the force is borne by supporting pins 22 via cap 17. This structure prevents the force from being applied to attracting magnet 18. As a result, attracting magnet 18 is kept free from damage.

Almost all the magnetic flux from magnet 18 runs through stator core 14 and travels to frame 2 via cap 17 made of magnetic material, and forms a magnetic path returning to magnet 18 from a top surface of frame 2. The magnetic flux thus does not cross link with magnetic flux from the coil formed of copper wire 6 of stator 15, or magnetic flux from rotor magnet 3. As a result, magnetic circuits of stator 15 and magnet 3 are free from magnetic interference from attracting magnet 18, and do not adversely affect spin of rotor 11.

Magnet 18 is desirably magnetized unipolar thickness-wise such as N pole on its top surface and S pole on its bottom surface or vice versa, or it is desirably magnetized bipolar in parallel planes, such as N-S on its top surface and S-N on its bottom surface.

In the second embodiment, as with the first embodiment, an end face on the side of first end 19, which is not press-fitted to stator core 14, of cap 17 has a smaller inner diameter than that of another section 20 of cap 17, where section 20 is press-fitted. This formation prevents oil from splashing outside cylindrical section 21 even if the oil leaks from a top of oil-impregnated metal 5 during rotation, because cylindrical section 21 of cap 17 works as a barrier against oil splashing.

A radial gap is provided between an outer wall of metal 5 and an inner wall of cylindrical section 21. Oil splashing to cylindrical section 21 enters into the radial gap, and returns to oil-impregnated metal 5. This radial gap can thus recycle the oil. The structure discussed above improves oil-holding performance of metal 5, and collects the splashed oil and returns it to oil-impregnated metal 5 per se.

Further in this second embodiment, magnetic attracting force works between attracting magnet 18 and the top surface of frame 2. Therefore, magnetic energizing force (attracting force) works axially to attract rotor 11 toward stator 15. This structure serves to eliminate a need to deviate a center of an axial length of stator core 14 from a center of an axial length of rotor magnet 3, i.e. a need to deviate magnetic centers thereof. Therefore, the motor can be assembled with ease, and magnetic noise due to a deviation between the magnetic centers can be reduced.

Third Exemplary Embodiment

Figure 5A:
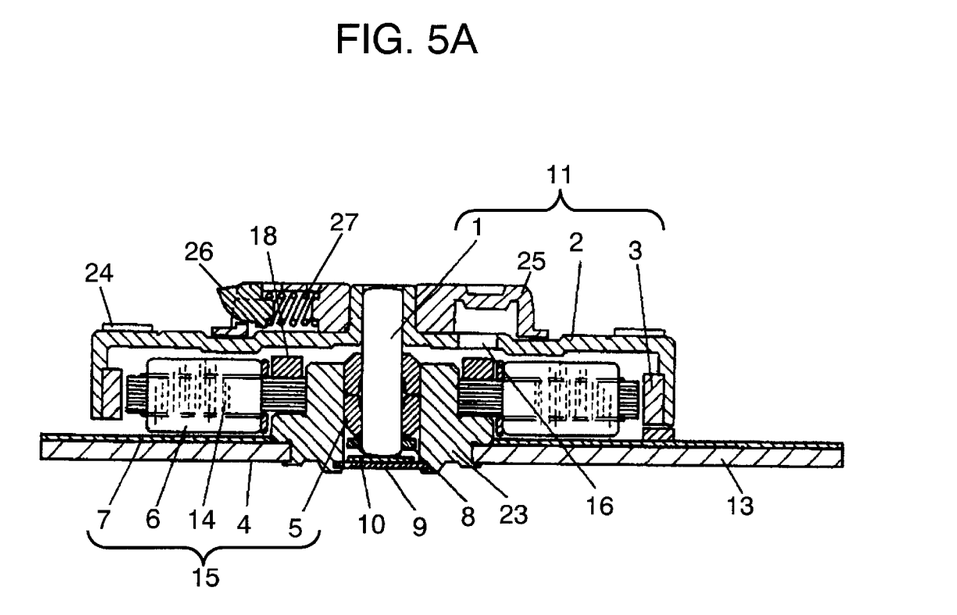
FIG. 5A shows a structure of a motor in accordance with a third exemplary embodiment of the present invention.
Figure 5B:
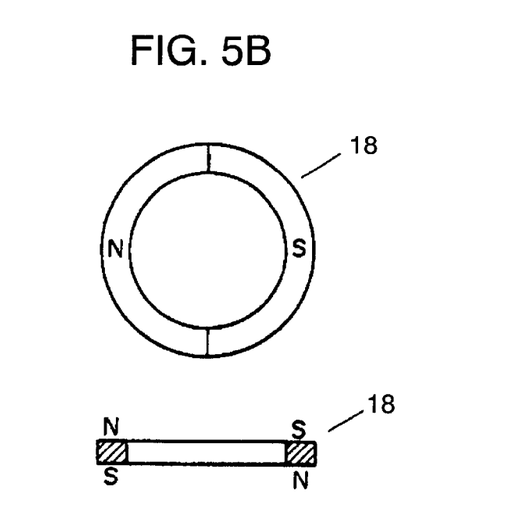
FIG. 5B illustrates a magnetized status of an attracting magnet in the motor shown in FIG. 5A.
Figure 6:
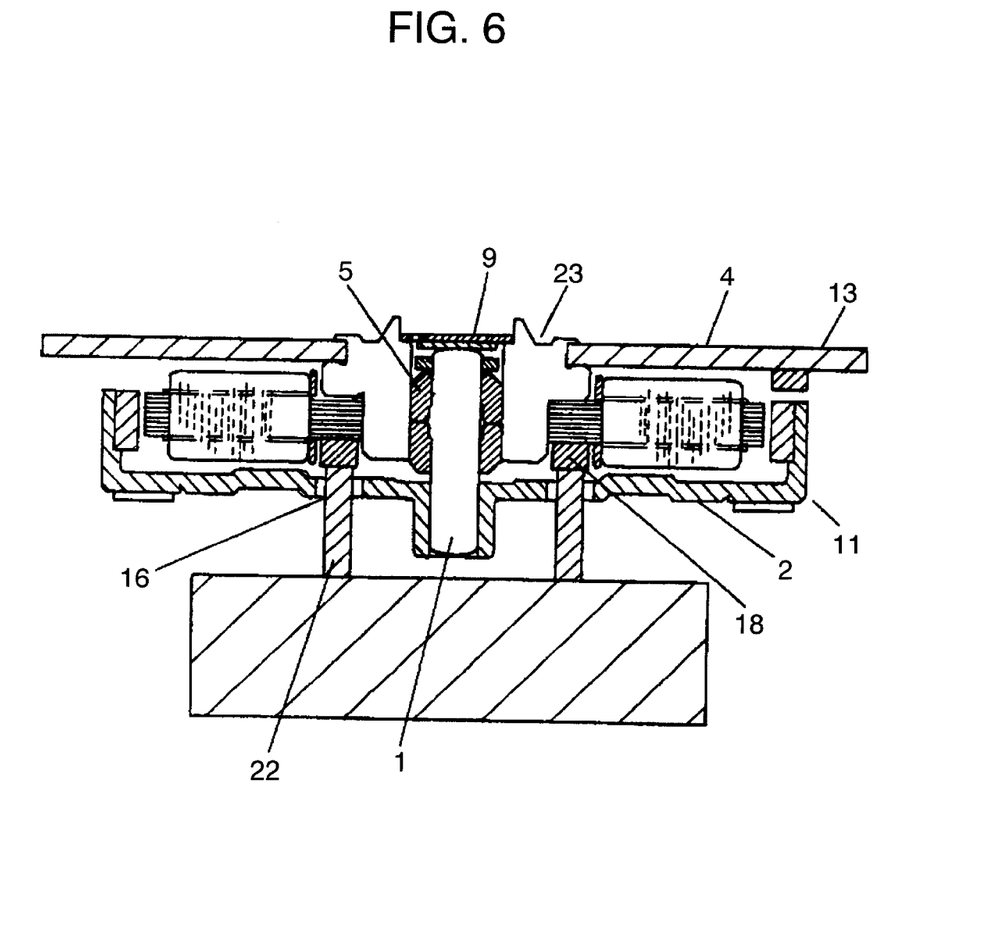
FIG. 6 illustrates how a bottom plate of the motor shown in FIG. 5A is press-fitted.

FIG. 5A shows a structure of a motor in accordance with the third exemplary embodiment of the present invention. FIG. 5B illustrates a magnetized status of an attracting magnet in the motor shown in FIG. 5A. FIG. 6 illustrates how a bottom plate of the motor shown in FIG. 5A is press-fitted.

In FIG. 5A and FIG. 5B, shaft 1 transmits rotation. Ring-shaped rotor magnet 3, which is multipolar magnetized in a circumferential direction, is press-fitted or bonded to an inner wall of frame 2. In a top surface of frame 2, a plurality of through-holes 16 are punched. A burring-process is provided to a central section of frame 2, and shaft 1 is directly press-fitted into the burring-processed section. Rotor 11 thus comprises shaft 1, frame 2 and magnet 3.

Bracket 4 is made of magnetic material and formed by press working. Bracket 4 is unitarily formed with mounting base 13 which is used for mounting the motor to an apparatus. Further, bearing housing 23 is mounted to bracket 4 by caulking or the like.

Oil-impregnated metal 5 is accommodated inside of bearing housing 23; however, oil-impregnated metal 5 can be unitarily formed with bearing housing 23 instead of being accommodated therein. As shown in FIG. 5A, metal 5 can also be formed of two parts that are axially separated. Stator core 14 is press fitted outside bearing housing 23. Copper wire 6 is wound on stator core 14 via an insulator made of resin.

Printed circuit board 7, to which at least a part of circuits for controlling and driving the motor is mounted, is rigidly bonded to mounting base 13 with double-faced adhesive tape (not shown). An end of copper wire 6 is connected onto board 7. Stator 15 thus comprises bracket 4, oil-impregnated metal 5, copper wire 6 and stator core 14.

Attracting magnet 18 is mounted on an upper face of stator core 14, where the upper face is opposite to through-holes 16 punched in the top surface of frame 2. Magnet 18 is made of material having excellent magnetic characteristics such as sintered magnet of Neodymium-Iron-Boron (Nd-Fe-B) system. Magnetic attracting force works between attracting magnet 18 and the top surface of frame 2. Therefore, magnetic energizing force (attracting force) works axially to attract rotor 11 toward stator 15. This structure serves to eliminate a need to deviate a center of an axial length of stator core 14 from a center of axial length of rotor magnet 3, i.e. a need to deviate the magnetic centers thereof. Therefore, the motor can be assembled with ease, and magnetic noise due to a slide between the magnetic centers can be reduced.

Stopper 8, preventing rotor 11 from coming off in a thrust direction, is formed by metal press-working, and press-fitted to an end of shaft 1. Bottom plate 9 bears load of rotor 11 in the thrust direction via resin board 10 which exhibits abrasion resistance, and is fixed to a bottom section of bearing housing 23 by caulking. Because of the plurality of through-holes 16 punched in the top surface of frame 2, when bottom plate 9 is caulked with housing 23, an end face of magnet 18 can be supported by supporting pins 22 through through-holes 16. Caulking force is thus not applied to mounting base 13 of bracket 4.

As result, right angles of bearing housing 23 with respect to mounting base 13 are accurately maintained. Mounting base 13, oil-impregnated metal 5 press-fitted to mounting base 13, and shaft 1 journaled by metal 5 can thus be assembled maintaining accurate right angles.

With regard to fixing bottom plate 9 to bearing housing 23, housing 23 can be caulked with light load if housing 23 is made of an easily extendable copper alloy. Therefore, when plate 9 is caulked and fixed to housing 23 while magnet 18 is supported by pins 22, magnet 18, made of sintered magnet of Nd-Fe-B system, is free from being damaged because the caulking needs only a light load.

Attracting magnet 18 is preferably magnetized bipolar in parallel planes as shown in FIG. 5B. When a plane is magnetized bipolar or multipolar, magnetic flux generated from N pole of magnet 18 forms a magnetic path running to frame 2 opposite magnet 18, and returning to S pole of magnet 18. Further, magnetic flux from magnet 18 utilizes stator core 14 as a part of the magnetic path, where magnet 18 per se is mounted to stator core 14. Almost all of the magnetic flux from magnet 18 and magnetic flux from coils of stator 6, or that of rotor magnet 3, thus do not cross link each other. Magnetic circuits of stator 15 and magnet 3 are not subjected to magnetic interference from attracting magnet 18, so that rotor 11 can spin freely without being adversely affected.

At an end of shaft 1, frame 2 made of a pressed-member is mounted. In a plane of an outer circumference of frame 2, turntable cushion 24 for receiving a disc (not shown) is pasted. Disc-holding ring 25, of an approximately cylindrical shape, for holding an internal circular section of the disc is press-fitted or rigidly bonded to frame 2. Disc-holding ring 25 can position the disc in a radial direction, and the disc is spun with turntable cushion 24 pressed thereto; therefore, disc-holding ring 25 has holes therein for accommodating disc-clamping-claws 26. Spring 27 urges disc clamping-claws 26 in the radial direction. The disc is urged to turntable cushion 24 by disc-clamping-claws 26. This structure allows the disc to spin at a high speed without floating of frame 2, and information can be read or written from/to the disc.

Fourth Exemplary Embodiment

Figure 7:
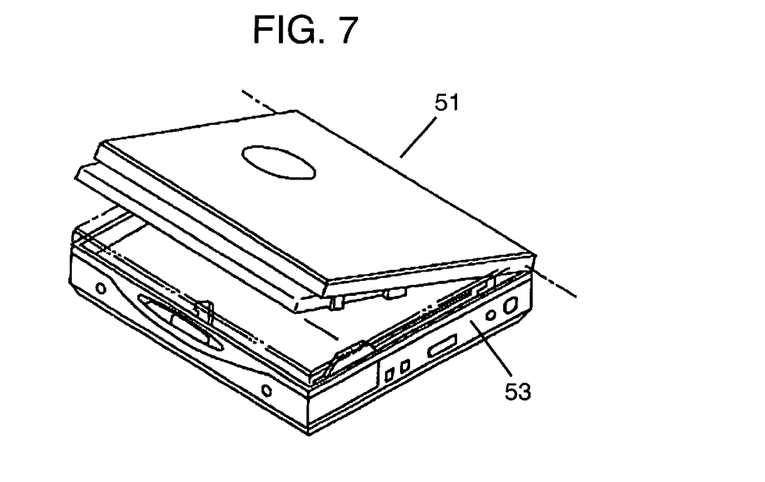
FIG. 7 shows a figure of an apparatus in accordance with the present invention.
Figure 8:
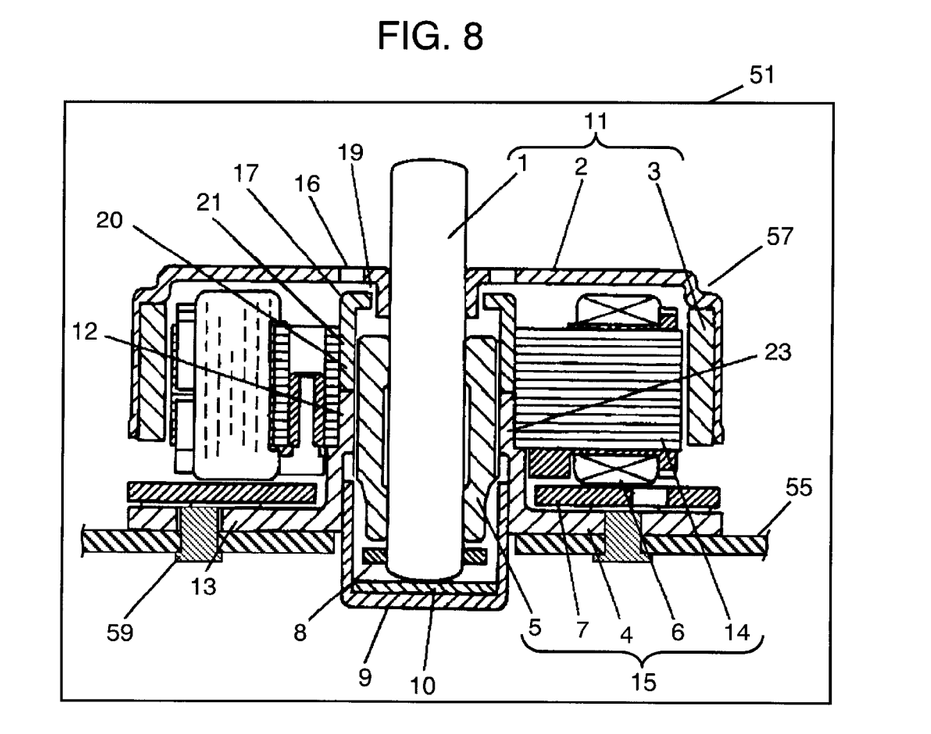
FIG. 8 shows a schematic structure of the apparatus shown in FIG. 7, wherein the apparatus employs the motor in accordance with the first exemplary embodiment.

FIG. 7 shows an outward appearance of an apparatus in accordance with the fourth exemplary embodiment of the present invention. FIG. 8 shows a schematic structure of the apparatus shown in FIG. 7, where the apparatus employs the motor in accordance with the first exemplary embodiment.

Apparatus 51 shown in FIG. 7 is specifically a compact-disc driving apparatus including housing 53. In FIG. 8, the motor in accordance with the first embodiment is mounted within housing 53 of apparatus 51. Mounting base 13 of motor bracket 4 is fixed to a mounting section 55 of the apparatus with screws 59.

The apparatus in accordance with the fourth embodiment can enjoy the same advantages as the motor in the first embodiment. The motor to be mounted to the apparatus of the present invention can be in accordance with not only the first embodiment but also the second or third embodiments. The apparatus of the present invention can expect the same advantages of the respective motors in accordance with each of the embodiments.

As discussed above, in a motor mainly used for reading or writing information from/to a disc such as a compact disc or a video disc, a cap is disposed above and outside an oil-impregnated metal. This structure allows the oil-impregnated metal to improve its oil-holding performance as well as collects and returns splashed oil to the oil-impregnated metal per se. Therefore, even if the oil leaked from the oil-impregnated metal splashes outwardly due to spin of the rotor, the oil splashed can be recycled to the metal per se, so that a bearing is not reduced in reliability when the motor is spun at a high speed. As a result, the present invention can provide a motor well suited for an apparatus running at a high speed, as well as an apparatus using the same motor.

Magnetic attracting force works between an attracting magnet and a top surface of a motor frame. Therefore, magnetic energizing force (attracting force) works axially to attract a rotor toward a stator, so that the rotor is restrained from moving and vibrating axially when the motor spins at a high speed. As a result, read/write errors can be reduced.

The cap is, in particular, made of magnetic material, and almost all of magnetic flux from the attracting magnet travels along a path running through the top surface of the frame and the cap, and returning to the attracting magnet. The magnetic flux from the attracting magnet does not adversely affect magnetic circuits of a rotor magnet.

What is claimed is:

1. A motor comprising:
    a bracket defining
        (i) a bearing housing unitarily formed with said bracket, and
        (ii) a mounting base for mounting the motor to an apparatus, said mounting base being unitarily formed with said bracket;

a metal fixed to an inner wall of said bearing housing, wherein said metal is impregnated with oil;

a stator on an outer wall of said bearing housing, said stator including a stator core with a coil therearound;

a rotor including
 (i) a frame having in a top surface thereof through-holes,
 (ii) a shaft fixed to said frame, and
 (iii) a rotor magnet fixed to said frame, a cap of magnetic material facing said through-holes and spaced axially from said through-holes, said cap being spaced from an outer circumference of said metal and being axially spaced from an end face of said metal, and also being fixed at an inner circumference of said stator core; and an attracting magnet positioned outside of said cap.

2. The motor according to claim 1, wherein said cap is fixed at the inner circumference of said stator core by having a body portion of said cap be press-fitted to an inner wall of said stator core while an end portion of said cap is not press-fitted to said inner wall, with said end portion having an end face defining an inner diameter that is less than an inner diameter of said body portion, and with said end face being axially spaced from said frame by a distance that is less than a distance by which an end face of said attracting magnet is spaced from said frame.

3. A motor comprising:

a bracket including a mounting base for mounting the motor to an apparatus;

a bearing housing fixed to said bracket;

a metal contained in said bearing housing, wherein said metal is to be impregnated with oil;

a stator on an outer wall of said bearing housing, said stator including a stator core with a coil therearound;

a rotor including
 (i) a frame having in a top surface thereof through-holes,
 (ii) a shaft fixed to said frame, and.
 (iii) a rotor magnet fixed to said frame; and an attracting magnet for magnetically attracting said frame, said attracting magnet being on an end face of said stator core such that said attracting magnet faces said through-holes and is axially spaced from said through-holes.

4. The motor according to claim 3, further comprising oil impregnated within said metal.

5. The motor according to claim 4, wherein said frame includes a cylindrical section integrated with said frame and extending from a central portion of said frame toward said metal.

6. The motor according to claim 4, wherein said attracting magnet comprises a sintered magnet of Neodymium-Iron-Boron system.

7. An apparatus comprising:

a housing; and a motor mounted within said housing via a mounting base, wherein said motor includes
 (i) a bracket defining said mounting base and a bearing housing,
 (ii) a metal fixed to an inner wall of said bearing housing, wherein said metal is to be impregnated with oil,
 (iii) a stator on an outer wall of said bearing housing, said stator including a stator core with a coil therearound,
 (iv) a rotor including
  (a) a frame having in a top surface thereof through-holes,
  (b) a shaft fixed to said frame, and
  (c) a rotor magnet fixed to said frame, and
 (v) a cap facing said through-holes and spaced axially from said through-holes, said cap being spaced from an outer circumference of said metal and being axially spaced from an end face of said metal, and also being fixed at an internal circumference of said stator core.

8. An apparatus comprising:.

a housing; and a motor mounted within said housing via a mounting base, wherein said motor includes
 (i) a bracket including said mounting base,
 (ii) a bearing housing fixed to said bracket,
 (iii) a metal contained in said bearing housing, wherein said metal is to be impregnated with oil,
 (iv) a stator on an outer wall of said bearing housing, said stator including a stator core with a coil therearound,
 (v) a rotor including
  (a) a frame having in a top surface thereof through-holes,
  (b) a shaft fixed to said frame, and
  (c) a rotor magnet fixed to said frame, and
 (vi) an attracting magnet for magnetically attracting said frame, said attracting magnet being on an end face of said stator core such that said attracting magnet faces said through-holes and is axially spaced from said through-holes.

9. The motor according to claim 8, further comprising oil impregnated within said metal.

* * * * *

UNITED STATES PATENT AND TRADEMARK OFFICE
CERTIFICATE OF CORRECTION

PATENT NO. : 6,661,131 B2
DATED : December 9, 2003
INVENTOR(S) : Hideshi Fukutani It is certified that error appears in the above-identified patent and that said Letters Patent is hereby corrected as shown below:

Column 9,
Line 9, please replace "said frame," with -- said frame; --.
Line 38, please replace "frame, and." with -- frame, and --.

Column 10,
Line 9, please replace "housing," with -- housing by having said bearing housing and mounting base be unitarily formed with said bracket, --.
Line 11, please replace "metal is to be impregnated" with -- metal is impregnated --.
Line 21, please replace "a cap facing" with -- a cap of magnetic material facing --.
Line 25, please replace "fixed at an internal circumference" with -- fixed at an inner circumference --.
Line 26, please replace "core." with -- core; and --.
Line 26, please insert a line break following "core; and" and then insert -- an attracting magnet positioned outside of said cap. --.
Line 27, please replace "An apparatus comprising:." with -- An apparatus comprising: --.

Signed and Sealed this

Twenty-third Day of November, 2004

JON W. DUDAS
*Director of the United States Patent and Trademark Office*